United States Patent

[11] 3,580,135

[72] Inventor Gordon H. Jones
Van Dyne, Wis.
[21] Appl. No. 854,998
[22] Filed Sept. 3, 1969
[45] Patented May 25, 1971
[73] Assignee Giddings & Lewis, Inc.
Fond du Lac, Wis.
Continuation-in-part of application Ser. No. 744,458, July 12, 1968, now Patent No. 3,540,346.

[54] CLAMPING APPARATUS FOR A MACHINE TOOL
14 Claims, 3 Drawing Figs.
[52] U.S. Cl. .................................................. 90/11A,
90/16, 77/3A
[51] Int. Cl. .................................................. B23c 1/02
[50] Field of Search ........................................... 90/11, 11.1, 14, 16; 77/3 (R), 3 (A)

[56] References Cited
UNITED STATES PATENTS
3,034,408   5/1962   Kampmeier ..................   90/11A

*Primary Examiner*—Gil Weidenfeld
*Attorney*—Olson, Trexler, Wolters & Bushnell

ABSTRACT: A machine tool having a longitudinally adjustable machining spindle carried by a rotary spindle sleeve and securely clamped releasably within the sleeve by a clamping bushing encircling the spindle. The clamping bushing is force fitted within the encircling structure of the sleeve so that residual compressive stresses are established. The sleeve and clamping bushing define an elongate, annular chamber, cylindrical in nature, which is disposed intermediate the ends of said bushing and sealed to render same a fluid chamber. Fluid pressure means are associated with said chamber to provide fluid under pressure, whereby said clamping bushing is restricted circumferentially to effect hard compressive contact with a machine tool spindle. The clamping arrangement utilizes a relatively thick, stiff clamping bushing structure in conjunction with a plenum chamber that is extremely narrow in section, whereby numerous advantages over prior clamps are attained.

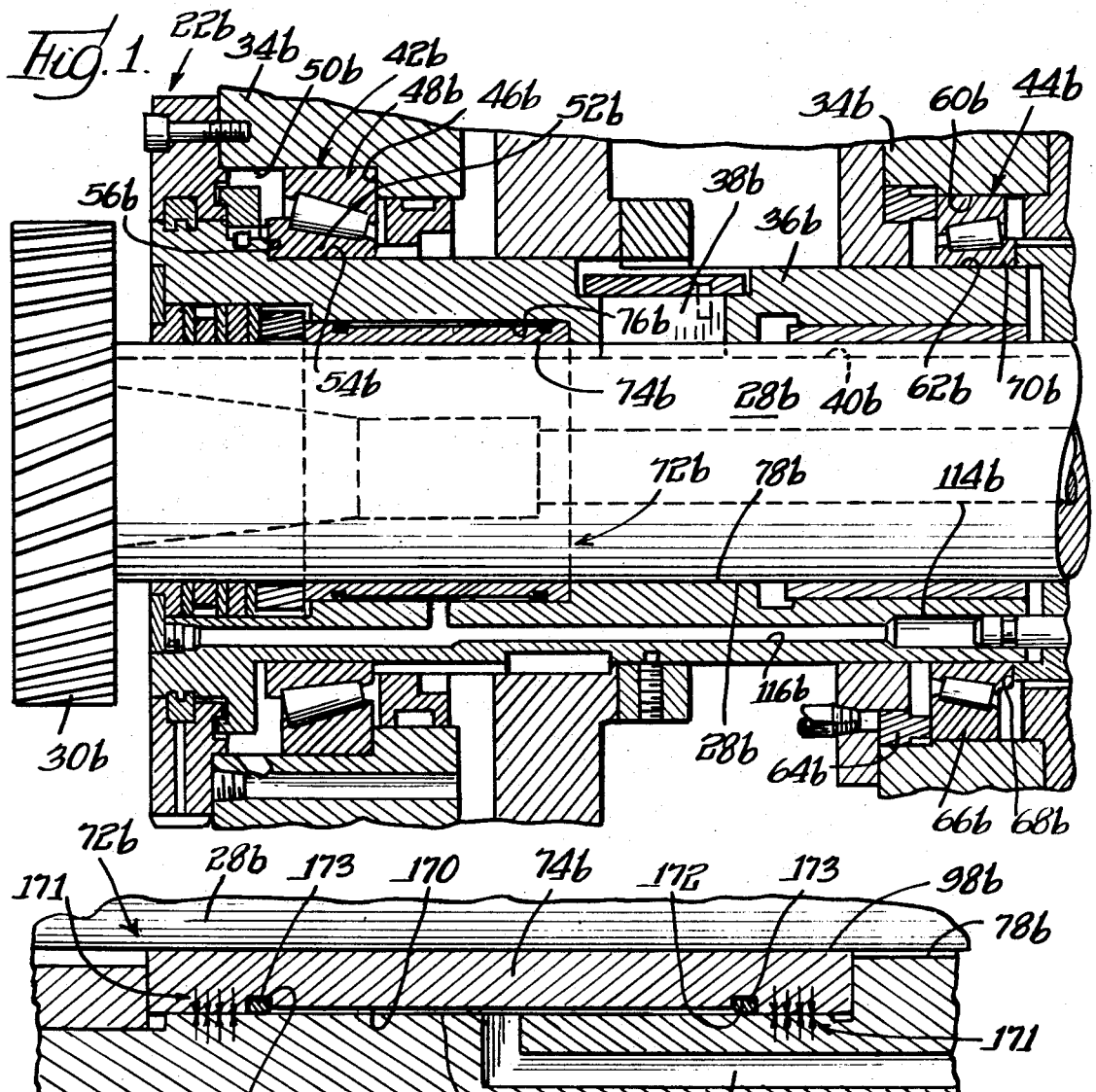
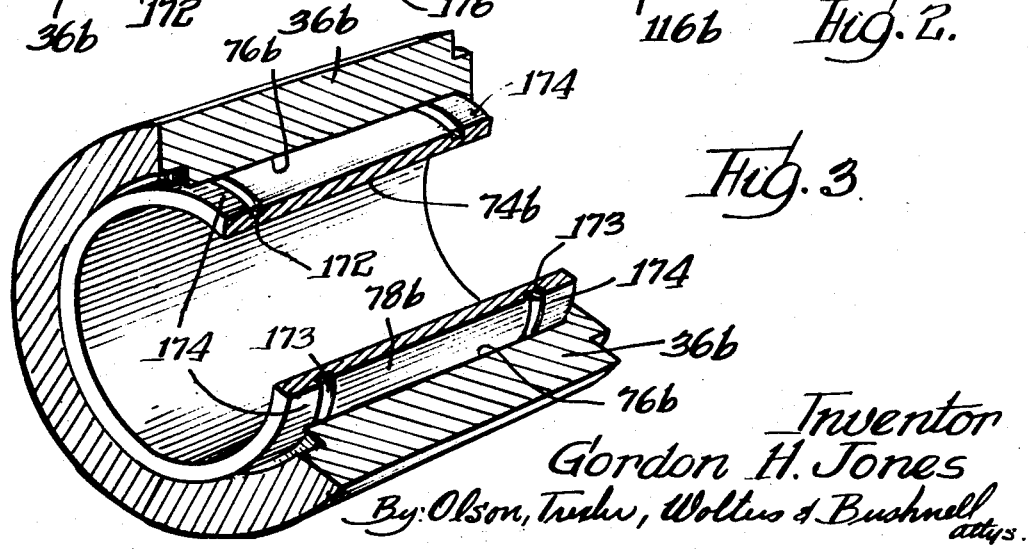

CLAMPING APPARATUS FOR A MACHINE TOOL

REFERENCE TO RELATED APPLICATION

The present application a continuation-in-part of applicant's previously filed, copending application, Ser. No. 744,458, filed on July 12,, 1968 now U.S. Pat. No. 3,540,346 and entitled "Machine Tool Having Longitudinally Adjustable Machining Spindle Hydraulically Clamped for Operation." In addition, the spindle clamping apparatus of the present invention also relates to a machine tool of the general type described and claimed in U.S. application Ser. No. 744,572, filed on July 12, 1968 now U.S. Pat. No. 3,516,328 and entitled "Machine Tool with Longitudinally Adjustable and Hydraulically Clamped Rotary Machine Spindle."

BACKGROUND OF INVENTION

The present invention is an improvement over that disclosed in my copending application, Ser. No. 744,458 mentioned above, and relates to machine tools in which a rotary machining spindle is longitudinally adjustable to any of an infinite number of working positions within a range of adjustment to locate in a desired working position a cutting tool carried by the outer end of the rotary spindle.

In machine tools of this type the machining tool spindle is supported by a rotary spindle sleeve which permits longitudinal adjustment thereof to locate a cutting tool in a desired working position. Prior to and during machining, the preadjusted spindle must be fixedly held in position, unaffected by the radial force reactions from the cutting tool.

The prevention of radial and axial displacement of the spindle by the force reactions established during operation has been complicated by the necessity for designing the support structure for the spindle to provide sufficient working clearance to permit longitudinal adjustment of the spindle through its supporting structure.

The structural and functional characteristics of machine tools of this character heretofore have been significantly less than perfect with respect to precise positioning of the rotating spindle in the exact working position desired. Any significant lack of precision in the radial location of the machining spindle while it is subjected to a radial load during operation of the machine is a source of imperfections in the machining performed and can create problems in controlling the machine automatically to perform machining operations with precise accuracy.

In the copending, parent application, Ser. No. 744,458, there are disclosed two embodiments of clamping means or apparatus which have proven effective in practice to overcome the above-mentioned problems. The invention of the present application is an improvement over said embodiments.

More specifically, the present, improved embodiment utilizes a shallow, circumferentially continuous plenum chamber, in conjunction with an underlying, relatively thick bushing wall section. With this construction certain advantages, in addition to those afforded by said embodiments of the copending application are realized, for example; improved radial stiffness; the use of lower operating pressures for attainment of the required holding force; improved dynamic dampening of spindle vibrations; and a reduction in the severity of the interference fit employed upon assembly, without a corresponding reduction in the holding forces established during use between the spindle sleeve and the clamping bushing.

DESCRIPTION OF DRAWINGS

FIG. 1 is a fragmentary sectional view of a machine tool supporting structure illustrating the machining spindle in its substantially fully retracted position and showing the rotatable spindle sleeve and the coacting spindle sleeve support structure, as well as the clamping means of the present invention.

FIG. 2 is a fragmentary view on an enlarged scale illustrating, in radial section, the hydraulically energized spindle clamping structure of the present invention.

FIG. 3 is a fragmentary perspective view showing the construction of the clamping bushing of the illustrated embodiment, as well as its relationship to the rotatable spindle sleeve.

DESCRIPTION OF THE ILLUSTRATED EMBODIMENT

As stated hereinbefore, the present invention is an improvement upon the several embodiments illustrated in my copending application, Ser. No. 744,458. In said application the general or overall construction of a machine tool of a type well known in the art and to which the instant application relates is illustrated in detail. Accordingly, while it is believed that the following detailed description, taken in conjunction with the drawings, constitutes a complete disclosure of all essential material, the disclosure of said copending application is incorporated herein by reference and may be referred to should a more complete understand be desired of the general environment and specific problems to which this invention relates.

Turning now to the drawings, the improved clamping arrangement is illustrated in detail in FIGS. 1—3, wherein same is employed to clamp adjustably a spindle 28b, in a predetermined, desired position with respect to machine tool head 22b, a portion of which is illustrated in section in FIG. 1. The machine tool head 22b is associated with a work supporting table [not shown], and is adapted to be adjusted both horizontally and vertically, as discussed in said copending application.

A machine tool head 22b of the type being discussed normally includes various drive means, or the like, which rotate a sleeve or chuck, carried either internally or externally of the machine tool head. In the illustrated embodiment, the support structure for spindle 28b is internally mounted within a housing support structure 34b and adapted to receive slidably a machine tool spindle 28b, such that the relative axial disposition of spindle 28b may be adjusted, as desired.

The spindle 28b is equipped and adapted at its outer or projecting end to support a machining tool exemplified in this instance by a rotary cutter 30b detachably secured to the outer end of the spindle. For performance of a desired machining operation on a workpiece [not shown] supported on the table [also not shown], the spindle 28b is preadjusted longitudinally to locate the machining tool 30b precisely in the longitudinal position, with respect to the axis of the spindle 28b, required for performing the machining operation at hand. Such longitudinal adjustment of the spindle 28b can be accomplished by conventional structure well known in the art and requiring no description at this time.

The machining tool, in this instance the cutter 30b, carried by the projecting end of the rotary machining spindle 28b, is normally subjected during a machining operation to a force reaction in a radial direction which is transmitted through the rotating spindle 28b to the sleeve 36b and the support structure 34b of the machining head 22b. Due to the clearance need to permit longitudinal adjustment of spindle 28b, this force reaction tends to cause the spindle 28b to vibrate, which tendency is precluded or considerably reduced by the clamp arrangement of the present invention, in a manner to be discussed fully hereinafter.

As illustrated in FIG. 1, the structure which supports the spindle 28b and sustains the force reactions on the cutting tool 30b transmitted to the spindle 28b includes a hollow elongated spindle sleeve 36b encircling the spindle 28b and located immediately within the end of the machining head housing or support structure 34b from which the projecting end of the spindle 28b cantilevers into overlying relation to a work supporting table [not shown].

Even though it may be moved vertically the machining head housing or support structure 34b is, itself, rigid and constitutes rigid support structure for the spindle sleeve 36b, which is keyed to rotate with the spindle 28b by key 38b, carried by the sleeve 36b and extending into longitudinal keyways 40b in the otherwise cylindrical spindle 28b.

The spindle sleeve 36b is precision journaled on the rigid support structure 34b preferably by two precision bearings 42b, 44b encircling the sleeve 36b adjacent its inner and outer ends respectively, as illustrated, The forward bearing 42b encircling the outer end of the sleeve 36b is a tapered roller bearing as shown and functions to rotatably support the sleeve 36b in a precisely accurate radial position in relation to the support structure 34b while at the same time locating the sleeve 36b axially with great precision in a predetermined longitudinal position with respect to the support structure 34b.

For this purpose, an annular locating abutment 46b on the support structure 34b faces axially outward to engage and axially locate the outer race 48b of the bearing 42b, which is firmly supported radially by an encircling support surface 50b on the support structure 34b. The inner race 52b of the bearing 42b fits with precision around a cylindrical surface 54b on the sleeve 36b to support the sleeve radially. An inwardly facing annular locating abutment 56b on the sleeve 36b fits against the axially outward face of the inner race 52b of the bearing 42b to coact with the bearing 42b and the locating abutment 46b on the support structure 34b to locate the sleeve 36b in a predetermined longitudinal position on the support structure 34b as recited.

The inner precision bearing 44b is precisely supported by an encircling surface 60b on the support structure 34b and fits with precision around a cylindrical surface 62b on the sleeve 36b to provide the desired precision radial support to the inner end of the sleeve 36b. Optimum functioning of both of the tapered roller bearings 42b, 44b is obtained by application of a residual axial load on both bearings which is effected in this instance, as illustrated, by means of a hydraulically actuated annular biasing piston 64b engaging the outer race 66b of the bearing 44b to transmit through the bearing 44b an axial biasing force that is transmitted to the sleeve 36b by an annular abutment 68b formed on the sleeve and engaging the inner bearing race 70b as shown. The axial biasing load applied to the sleeve 36b in this manner is transmitted through the sleeve back to the bearing 42b to assure at once optimum functioning of both bearings in supporting the sleeve 36b for rotation in a location that is determined with great precision both axially and radially.

At this juncture, it should be appreciated that any deviation or deflection of the machining spindle 28b from a precisely coaxial relation to the encircling sleeve 36b journaled by the precision bearings 42b, 44b will produce a corresponding imperfection in the accuracy with which machining is performed by the machining tool supported by the spindle. This follows from the fact that any deviation from perfection in the accuracy with which the supported machining tool 30b is held in a desired machining position is a source of a corresponding deviation from perfection in the accuracy with which machining is performed and can be a significant problem in the performing of machining to precise dimensional tolerances.

The problem of maintaining the rotating spindle 28b in precisely coaxial relation to the rotating spindle sleeve 36b during operation of the machine is complicated by the severe force reactions, particularly radial reactions, of the machining tool 30b on the spindle 28b.

Attainment of the objective of holding the spindle 28b in precisely coaxial relation to the supporting sleeve 36b against the force reactions is further complicated by the necessity for providing between the spindle and its support structure sufficient clearance to allow the spindle to move longitudinally in relation to its support structure. By the use of precision machining techniques, the clearance provided between the spindle 28b and its coacting support structure for the purpose of allowing longitudinal adjustment of the spindle, which is essential to the inherent character of a machine tool of this type, can be confined to a minimal dimensional value. In practice, the diametrical clearance is equal to $(0.0001 \text{ inch } d + 0.0001)$ where $d$ is the diameter of spindle 28b, and normally is with range of 3—6 inches.

Yet, it is most desirable that this minimal clearance provided between the spindle 28b and its support structure not become a source of error in the accuracy with which the spindle 28b and the sleeve 36b are held in coaxial relation to each other under the radial load reaction on the spindle.

While these considerations may be of limited consequence in the performing of rough machining operations where precise accuracy is not essential, they take on great importance in the performance of machining operations where even minute deviations from theoretical perfection are undesirable. Ideally speaking, it is highly desirable that deviation of the spindle 28b from perfect coaxial alignment with the sleeve 36b be totally eliminated in order that there be no error present that could be cumulative with other small errors in the machine tool to produce an aggregate error that could be troublesome, particularly in the operation of the machine tool under automatic control, which offers many advantages.

After being preadjusted longitudinally to the desired machining position, the spindle 28b is releasably held securely in its longitudinally preadjusted position for machining by the hydraulically operated clamp means of the present invention which is designated generally 72b and carried by the forward or outer end of the sleeve 36b. The clamp means 72b, prior to being actuated, permits longitudinal adjustment of spindle 28b relative to sleeve 36b, and will function when actuated to grip said spindle 28b securely about the circumference thereof to maintain true coaxial alignment with said sleeve 36b. Accordingly, due to the equal application of the clamping force about the circumference of the spindle 28b, displacement relative to said sleeve 36b by the radial force reaction of the machining tool 30b is virtually eliminated.

The hydraulically energized clamp means 72b provided for this purpose can best be viewed in FIG. 2. The clamp means 72b include a cylindrical clamping bushing 74b fashioned preferably from a seamless length of high strength resilient steel. The outer end of the spindle sleeve 36b is provided with a clamp bore 76b of greater diameter than the central axial bore 78b. The cylindrical clamping bushing 74b is disposed within the clamp bore 76b by means of an interference fit for a purpose to be detailed more fully hereinafter.

As can be seen in FIGS. 2 and 3, the internal cylindrical surface 98b of the clamping bushing 74b is sized to mate or conform with the interior cylindrical surface of a central axial bore 78b formed within the sleeve 36b. In point of fact, the clamp bushing receiving bore 76b constitutes a counterbore in the outer end of said central axial bore 78b with said surface 98b providing a continuation thereof when the clamp is in the deenergized or unactuated condition.

The clamping bushing 74b is provided with an annular relieved portion about the circumference thereof to provide an axially elongate peripheral groove 170. This peripheral groove 170 is shallow with respect to the radial wall thickness of the bushing 74b, its depth being on the order of 0.0035 inch, for example.

A seal ring groove 172 is provided at each end thereof. An O-ring 173 is disposed in each said seal ring groove 172, said O-ring being sized to have an outer diameter somewhat larger than the maximum outer diameter of the bushing 74b.

The elongate groove 170, in conjunction with the seal ring groove 172, in effect provide axially spaced land portions 174. These lands 173, which are disposed at the respective ends of the clamping bushing 74b, serve to define the maximum outer diameter of said bushing, this diameter being slightly greater than the inner diameter of the clamp bushing receiving bore 76b formed in the spindle sleeve 36b in order to provide for the aforementioned interference fit.

With the clamping bushing 74b engaged in bore 76b of the spindle sleeve 36b, as illustrated in FIGS. 2 and 3, it can be seen that the annular elongate groove 170 cooperates with the interior cylindrical surface of said bore 76b to define a circumferentially continuous, narrow cylindrical plenum chamber 176. The spindle sleeve 36b has passageways 116b formed therein which opens into chamber 176 and is associated with a source of fluid under pressure, supplied thereto by means of the circumferentially spaced pumps 114b.

In the illustrated embodiment, passageways 116b open directly into chamber 176; but it is envisioned that a distribution channel could be formed in the circumferential wall of bore 76b. The illustrated configuration is preferred, however, since the absence of an annular distribution channel enhances the vibration dampening characteristics of clamping arrangement 72b.

In the assembled condition it can be seen that the O-rings 173 are effective to isolate completely the lands 174 from the hydraulic actuating fluid under pressure. This feature is advantageous in that it precludes high-pressure actuating fluid from entering the interface between lands 174 and bore 76b, during operation of the clamp; the result of which would tend to separate the contiguous surfaces and destroy the interference fit.

Considering again groove 170, the aforementioned dimension of 0.0035 for the groove depth, is set forth by way of example only. In practice, groove 170 need be only of sufficient depth to insure the existence of a circumferentially continuous plenum chamber 176, after assembly is completed.

Accordingly, it should be noted that the radial thickness of the bushing wall structure underlying groove 170 is considerable when compared with the maximum wall thickness of bushing 74b, per se. It is emphasized at this time that in practice the ratio of this bushing wall dimension to spindle diameter is much greater for this embodiment than is said ratio for prior embodiments, wherein said underlying wall portion may be characterized as "relatively thick."

By way of comparison, where a 3/16-inch underlying bushing wall is used in conjunction with a 3½ inch diameter spindle, as discussed by way of example in regard to the embodiments of said copending application; with the present invention the bushing portion underlying groove 170 has a wall thickness on the order of three-eighths inch, or more. The determination of the exact value of this dimension is purely empirical in nature. For purposes of disclosure, however, certain parameters may be taken into consideration such that a formula may be used to advantage in determining bushing thickness for the range of spindle sizes normally employed. Said formula is as follows:

$$H = \frac{P}{5,000} - \frac{F}{2,600(d\%)(x)}$$

Where H represents the wall thickness of the clamp bushing 74b; P the applied pressure of the actuating fluid; F the axial force to be applied to the spindle; d the diameter of the spindle 28b; and X the axial length of the bushing portion underlying groove, 170, not including the O-ring grooves 173.

Again, it is emphasized that the thickness of the bushing 74b is not limited by the above formula, same merely functioning as a design tool. In practice this dimension must be "relatively thick," such that during use the entire bushing remains substantially rigid, as will be discussed hereinafter.

Upon the introduction of fluid under high pressure into plenum cavity 176, the clamping sleeve bushing 74b is forced or contracted radially inward into engagement with the spindle 28b. This clamping action is continuous about the entire circumference of the spindle 28b and allows no radial displacement of said spindle in relation to the clamping bushing 74b. However, with the foregoing in mind, it can be appreciated that no matter how severe the contraction of bushing 74b it is essential that the encircling wall of bore 76b remain in firm compressive engagement with the lands 174, such that the clamping bushing 74b is not subject to radial or axial displacement in relation to the sleeve 36b, and the spindle 28b is strongly held in precise coaxial relation to the sleeve 36b, as will presently appear. The forces which establish this engagement are illustrated in FIG. 2, and designated 171.

As is discussed in greater detail in said copending application, to provide the necessary compressive engagement of the clamping bushing with the encircling support structure on the sleeve upon actuation of the clamp, the clamping bushing is assembled with encircling structure on the sleeve with a severe interference fit, such that the bushing is contracted forcibly in diameter, producing therein residual compressive stresses. Of course, with the present embodiment it is essential that the forces 171 be of such a degree as to preclude separation of bushing 74b and sleeve 36b during operation. However, with the novel, relatively rigid construction of the clamping arrangement 72b certain stresses created during operation are employed to enhance or augment those established during the initial assembly.

More specifically, prior spindle clamps of this general type, employ expansible wall portions underlying the plenum chamber or chambers which are relatively thin. During operation, these wall portions bulge inwardly, and due to their thin nature, they do so substantially independent of the remaining thicker portions of the clamp bushing. That is to say that the bulging does not materially affect the disposition or condition of said thicker portion. This is occasioned by the fact that the juncture of the thin wall section with the adjacent, relatively thick bushing portions, operates somewhat like a hinge to permit independent movement. In contrast, bushing 74b employs a wall portion, underlying the plenum chamber 176, which is thick in comparison to prior clamping arrangements of this type. Accordingly, taking into account the fact that contraction is limited to the central portion, underlying chamber 176, by the sealing action of O-rings 173, and the stiff, inflexible nature of the juncture between said underlying portion and the end portions defining lands 174, it can be seen that contraction does not take place independently of said end portion. In practice, as the central portion underlying chamber 176 is contracted by subjection to fluid pressure, the end portions of the bushing 74b tend to flare or to expand, forcing lands 174 into tighter engagement with bore 76b.

With the preceding in mind, it can be seen that the operating forces created by the flaring or expanding of the end portion of bushing 74b, augment those residual initial forces established during assembly, the cumulative result being the forces 171, which assure the maintenance of the fixed engagement of bushing 74b in the bore 76b. Thus, while an interference fit is employed for initial assembly of bushing 74b in bore 76b, the severity thereof need not be as great as that used in the embodiments of said copending application.

In this regard, the operating pressure of the actuating fluid is taken into consideration, as is the flaring of the end portion of bushing 74b, and the respective dimensions of the bore 76b and said bushing 74b are adjusted accordingly, the diameter of the external surface 78b of bushing 74b being selected such that it exceeds the diameter of bore 76b by a selected amount. This amount can be calculated theoretically or arrived at experimentally. But in either case, although the central portion of bushing 74b is forcibly contracted and sleeve 36b expanded somewhat during operation, the firm engagement of lands 174 with bore 76b is maintained, since the magnitude of the initial stresses, plus those created during operation are such that they cannot be relieved by the pressure of the hydraulic actuating fluid.

At first instance, it would appear that all one need do to attain the desired clamping or holding force for spindle 28b is to adjust upwardly the operating pressure of the hydraulic actuating fluid; however, the problem is not so easily solved. In this regard, it should be noted that not only does bushing 74b contract upon actuation, but sleeve 36b expands. When this expansion occurs, an increased radial load is placed on the precision bearings 42b and 44b, which tends to reduce their efficiency as well as their operating life.

Accordingly, with the use of machine tool arrangements of this type in high precision machining operations, there is a definite need for clamping apparatus which provide the requisite holding force and radial stiffness with the minimum operating pressure. While the embodiments disclosed in the aforementioned copending application go a long way in solving these problems, the present construction provides certain additional advantages thereover. In addition to the reduction in the severity of the interference fit discussed above, the construction of clamping arrangement 72b permits the use of lower actuating or operating pressures, which leads to still further advantages. Primarily, in comparison to high-pressure clamps, with lower actuating pressures, the expansion of sleeve 36b is less, and correspondingly the radial stresses placed on bearings 42b and 44b are reduced.

More specifically in this regard, it should be noted that chamber 176 is shallow and extends about the entire periphery or circumference of the clamping bushing 74b, said chamber being continuous and uninterrupted, with no land portions or the like dividing it into a plurality of subchambers. In practice, this continuous chamber feature, taken in conjunction with the relatively thick wall structure of the bushing 74b, provides a clamping force to actuating pressure ratio which is extremely effective.

With the present embodiment, the clamping force exerted by the bushing 74b on the spindle 28b is applied over a substantially wide continuous annular band or portion of the outer peripheral surface of spindle 28b. That is to say, the axial length of the respective surfaces of clamping bushing 74b and spindle 28b in clamped engagement is greater than that attained with separated plenum chamber arrangements.

The net result of this construction is that a clamping fluid pressure on the order of 2,000 to 3,000 p.s.i. may be employed to attain the required holding strength, as opposed to pressures of approximately 5,000 p.s.i. needed with the embodiments of said copending application. Also, the increased area of contact between bushing 74b and spindle 28b provides for greater axial rigidity, and therefore more precision results in the machining operation.

Further, attention is specifically invited to the fact that chamber 176 is substantially shallow. Accordingly, the aforementioned lower operating pressure may be used, and the advantages afforded thereby realized without an appreciable reduction, if any, in radial stiffness. Briefly, in this regard, it should be noted that during operation the cutting forces transmitted to spindle 28b tend to cause said spindle to vibrate. Considering then the clamped engagement of bushing 74b with said spindle 28b, and the rigid nature of the assembly supporting sleeve 36b, it can be seen that vibration of said spindle can occur only upon radial movement of the wall portions of said spindle bushing 74b, which in turn will take place only upon displacement of the fluid in plenum chamber 176, about the circumference thereof. That is to say, for the spindle 28b to move upwardly, as viewed in FIG. 1, fluid would have to be displaced from the upper arcuate portion of the plenum chamber 176 to the lower region thereof. As compared to chambers of considerably greater depth, which permit relatively free migration of fluid, the displacement or movement of fluid in the shallow chamber 176 is retarded or impeded. Correspondingly, since fluid displacement is retarded, vibration of spindle 28b is substantially hindered, and upon initial movement will dissipate or be dampened quite rapidly.

As an alternate form of the present invention, it would be possible to form the shallow groove 170 and the seal ring groove 172 in the wall of sleeve bore 76b, and use a uniform cylindrical bushing 74b. The general configuration and mode of operation of such an embodiment would be substantially the same, since a narrow, continuous plenum chamber 176b would be employed in conjunction with a thick, underlying centralized bushing wall portion, the adjacent bushing end portions being isolated from actuating fluid by means of the O-ring seal arrangement and engagement with lands formed on the sleeve proper.

Although the foregoing description relates primarily to the embodiment illustrated in the accompanying drawings, it should be noted that this application is a continuation-in-part of U.S. application Ser. No. 744,458. Accordingly, it will be apparent to those skilled in this art that certain features of the embodiments disclosed in said copending application, as well as other changes, may be incorporated in the instant embodiment without departing from the spirit and scope of the invention.

With the preceding paragraph in mind, what is claimed and desired to be secured by Letters Patent is:

I claim:

1. In a machine tool comprising, support structure, a spindle sleeve carried by said support structure and adapted to receive slidably a machining tool spindle, bearing means rotatably supporting said spindle sleeve, such that said sleeve and an operably connected machining tool spindle may be rotated relative to said support structure; clamping means for adjustably securing said machining tool spindle in a predetermined axial position relative to said spindle sleeve, said clamping means including; a clamp bore formed in said spindle sleeve, an annular clamp bushing disposed within said bore, said bushing and clamp bore defining an elongate circumferentially continuous plenum chamber and a pair of axially spaced annular land portions, one said land portion disposed at each end of said chamber, a fluid path for operably connecting said plenum chamber with a source of high-pressure operating fluid whereby said fluid may be introduced into said chamber to contract and force said bushing into rigid clamping engagement with a machining tool spindle disposed within said spindle sleeve, and said bushing in the unassembled condition having a maximum outer diameter greater than the minimum diameter of said clamp bore to provide an interference fit therebetween in the assembled condition, such that at each said land portion said spindle sleeve is in compressive engagement with said bushing to establish residual stresses therein.

2. Clamping means as defined in claim 1, further including high-pressure fluid supply means carried by said spindle sleeve, said fluid supply means being operably connected to said fluid path for supplying operating fluid to said plenum chamber.

3. Clamping means as defined in claim 1 wherein the radial width of said plenum chamber is extremely small to hinder the displacement of operating fluid.

4. Clamping means as defined in claim 1, wherein the wall of the bushing portion underlying said plenum chamber is relatively thick, so as to provide a substantially rigid clamp bushing, wherein upon contraction of said underlying bushing portion, the end portions thereof will be expanded into increased compressive engagement with the sleeve.

5. Clamping means as defined in claim 1 wherein said circumferentially continuous plenum chamber is defined by an elongate groove formed in the outer peripheral surface of said clamp bushing, which groove defines axially spaced lands on said bushing.

6. Clamping means as defined in claim 5, wherein said clamp bushing includes a pair of axially spaced annular seal grooves formed in the outer surface thereof, one of said pair being disposed at each end of said elongated peripheral groove to define the axial extremities thereof, and an annular seal disposed in each said seal groove and in engagement with said clamp bore.

7. Clamping means as defined in claim 5, wherein said elongate groove is shallow, such that the said circumferentially continuous plenum chamber is extremely small in radial width to hinder the displacement of operating fluid during operation, and thereby dampen the vibrations of said spindle.

8. Clamping means as defined in claim 5 wherein the portion of said bushing underlying said groove is relatively thick in radial section, so as to provide a substantially rigid junction between said underlying portion and the end portions of said bushing, such that upon contraction of said underlying portion by operating fluid, the end portion thereof will expand to establish compressive forces which augment those created upon assembly.

9. In combination; a machine tool including, support structure, a spindle sleeve carried by said support structure and adapted to receive slidably a machining tool spindle, bearing means rotatably supporting said spindle sleeve, such that said sleeve and an operably connected machining tool spindle may be rotated relative to said support structure; and clamping means for adjustably securing said machining tool spindle in a predetermined axial position relative to said spindle sleeve, said clamping means including, a clamp bore formed in said spindle sleeve, an annular clamp bushing disposed within said bore, said bushing and clamp bore defining an elongate, circumferentially continuous plenum chamber, and a pair of axially spaced annular land portions, one disposed at each end of said chamber, a fluid path for operably connecting said plenum chamber with a source of high-pressure operating fluid whereby said fluid may be introduced into said chamber to contract and force said bushing into rigid clamping engagement with a machining tool spindle disposed within said spindle sleeve, and said bushing in the unassembled condition having a maximum diameter greater than the minimum diameter of said clamp bore to provide an interference fit therebetween in the assembled condition, such that at each said land portion said spindle sleeve is in compressive engagement with said bushing to establish residual stresses therein, which stresses assist in maintaining said compressive engagement throughout the clamping operation.

10. The combination as defined in claim 9, wherein said clamp bushing has an elongate, annular groove which cooperates with said bore to define said plenum chamber and said land portions being defined by the end portion of said bushing.

11. The combination as defined in claim 10, wherein said elongate groove is shallow in depth, such that the radial width of the resulting plenum chamber is relatively small, whereby during operation, the displacement of operating fluid in said chamber is impeded and the vibrations of said spindle are accordingly dampened.

12. The combination as defined in claim 9, wherein the bushing wall portion underlying said chamber is relatively thick to provide a substantially rigid juncture between said underlying portion and the end portions of the bushing, such that upon contraction of said underlying portion, said end portions will be flared radially outward to establish compressive forces which augment those created during assembly.

13. The combination as defined in claim 12, wherein said plenum chamber is defined by an elongate groove formed in the outer periphery of said bushing, intermediate the ends thereof.

14. The combination as defined in claim 13 wherein said groove is shallow.